Figure 1:
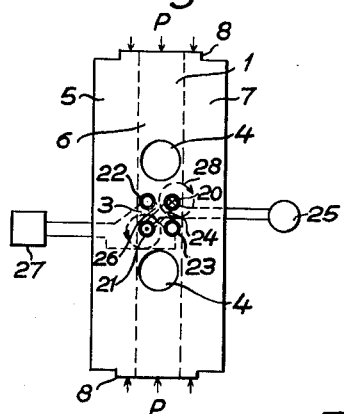

June 18, 1963  O. DAHLE ET AL  3,093,999
MAGNETOELASTIC FORCE MEASURING DEVICE
Filed Sept. 19, 1960

INVENTORS
Orvar Dahle
LARS BERGGREN
BY
Bailey, Stephens & Huettig

United States Patent Office 3,093,999
Patented June 18, 1963

3,093,999
MAGNETOELASTIC FORCE MEASURING DEVICE
Orvar Dahle and Lars Berggren, both of Vasteras, Sweden, assignors to Allmanna Svenska Elektriska Aktiebolaget, Vasteras, Sweden, a Swedish corporation
Filed Sept. 19, 1960, Ser. No. 56,961
Claims priority, application Sweden Sept. 23, 1959
4 Claims. (Cl. 73—141)

The present invention is related to a magneto-elastic force measuring device of the type described in Patent Specification No. 2,895,332. The force measuring device comprises consequently at least one measuring body of magneto-strictive material which is influenced by the mechanical force to be measured. The measuring body is provided with a number of holes or ducts, normally four, penetrating the body and in which two coils are located, one of which serves as an excitation winding and is connected to an electric current source, whereas the other one serves as a measuring winding and is connected to an electric measuring instrument. The coils are normally so arranged that their winding planes are substantially perpendicular to one another and form an angle of approximately 45° with the direction of the mechanical force acting upon the measuring body. Due to the magneto-strictive properties of the measuring body the mutual inductance between the coils and consequently the voltage induced in the measuring coil will become dependent upon the mechanical stresses which are produced by the mechanical force acting upon the measuring body in those portions of the measuring body where the magnetic flux has its largest density, that is principally in the portion of the measuring body enclosed by the windings. These portions of the measuring body are in the following for the sake of simplicity called the measuring zone.

In hitherto known measuring bodies of this type, two opposite sides of the measuring body are provided with projections having a smaller cross section than the measuring body itself and being located oppositely across the measuring zone and upon which the force to be measured acts. Due to these projections the measuring result becomes comparatively independent of the distribution of the force to be measured over the surfaces upon which the force acts. The projections are further so dimensioned that any mechanical overloading of the material of the measuring body occurs earlier in the projections than in the edges of the winding ducts lying within the measuring zone, due to which the risk of permanent deformations of the measuring zone giving measuring errors as a result will be reduced. Measuring bodies of this type have also the advantage that they have a very high sensitivity. They are, however, also subject to certain disadvantages which in certain applications are very serious.

These disadvantages are due to the fact that in measuring bodies of the described type the force influencing the measuring body is either substantially evenly distributed over the cross section of the measuring body or, when the measuring body is provided with the above mentioned projections, distributed in such a way that the measuring zone is influenced by a large force than those portions of the measuring body which lie close to the outer edges of the measuring body. Further, the mechanical stresses in the edges of a hole in an evenly loaded body are about three times larger than in the other portions of the body. In the known measuring bodies consequently the mechanical stress in the edges of the winding ducts and so in the measuring zone becomes considerably larger than in the other portions of the measuring body, which consequently are made very inefficient use of from a mechanical point of view. Furthermore, a sufficiently constant proportion between the output voltage for the measuring winding and the force influencing the measuring body is obtained only below a certain value of the mechanical stress in the measuring zone, and this value is for all usable materials lower, and for some of them considerably lower, than the mechanical stress which may be allowed from a purely mechanical point of view. If, consequently the measurement is to be kept within the linear measuring range of the measuring body, all portions of the measuring body will be made very inefficient use of from a mechanical point of view and the measuring device will consequently be large when it comes to measuring large forces. In measuring devices for large forces, which normally consist of several similar adjacent measuring bodies forming one mechanical unit and the output voltages of which are added together, it is, however, of course, of fundamental importance that the measuring bodies operate within the linear measuring range in order that an error-free measuring shall be obtained. In many applications it is further of great importance that the measuring device is as small as possible.

The present invention is related to a magneto-elastic force measuring device of the above mentioned type, which is not subject to the above mentioned disadvantages. According to the invention, the measuring body or the measuring bodies respectively of the force measuring device is so designed that the portion of the measuring body consisting of the measuring zone and those parts which lie between said measuring zone and the sides of the measuring body upon which the mechanical force is acting, is mechanically considerably weaker than the remaining parts of the measuring body so that said portion absorbs a smaller share of the force influencing the measuring body than in proportion to its cross section perpendicular to the direction of the mechanical force. Due to this it is obtained that the ratio between the mechanical stress in the measuring zone and the mechanical stress in the other parts of the measuring body becomes considerably smaller than in measuring bodies of the type hitherto known, due to which these other parts of the measuring body can be more efficiently used from a mechanical point of view without the mechanical stress in the measuring zone exceeding the value allowable for obtaining a linear measuring. The invention provides consequently a measuring device which compared with a measuring device of the known type with the same dimensions can measure a considerably larger force while still maintaining a good measuring linearity.

Figure 2:
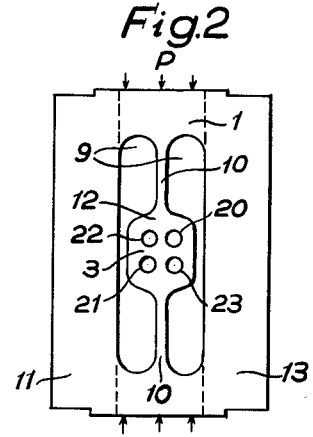
Figure 3:
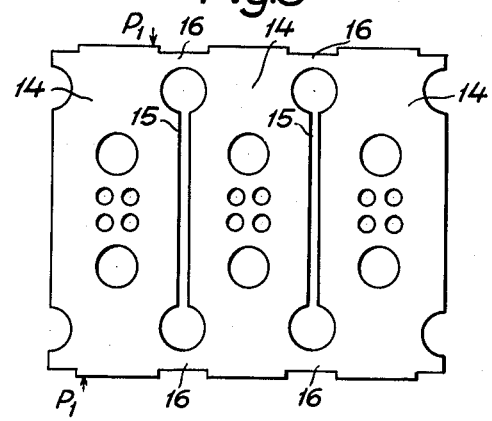
Figure 4:
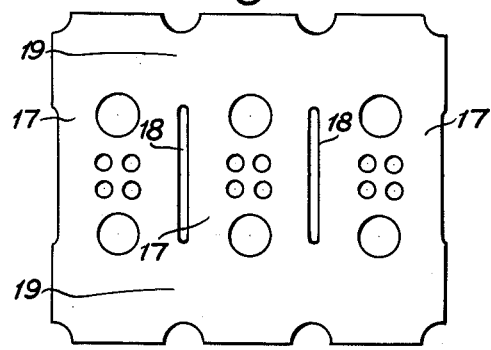

In practice, several different forms of the invention are possible, and in the accompanying drawings, FIGURES 1 and 2 show two different forms of single measuring bodies according to the invention, whereas FIGURES 3 and 4 show two different forms of measuring devices consisting of several measuring bodies according to the invention.

FIGURE 1 shows a measuring body 1, which in a manner known per se is provided with four central ducts 20, 21, 22, and 23. In two of the ducts, 20 and 21, there is wound an exciting coil 24 connected to a source 25 of electric current. In the other two ducts 22 and 23 is wound a measuring coil 26 connected to a voltage sensing device 27. The coils are shown in the figure with only one turn each, for the sake of simplicity, but obviously there may be more turns. When the exciting coil 24 is traversed by electric current in the direction shown in the figure a magnetic flux 28 is produced in the measuring body. Since the winding plane of the measuring coil 26 lies at right angles to that of the exciting coil 24, the net flux through the coil 26 will be zero so that no voltage is induced in this measuring coil. If now a mechanical force P is allowed to act on the measuring body 1 in a manner indicated by the arrows and if the measuring body 1 is assumed to be of a material having positive magnetostriction, the permeability of the material will decrease in the vertical direction and increase in the horizontal direction. This results in a change in the direction of the magnetic flux lines in the measuring body, and, as the effect of the changes in the permeability is most pronounced at the centre of the measuring body where the flux density is greatest, the flux lines will be deformed so that the measuring coil 26 embraces a part of the flux and a voltage is induced in it. The magnitude of this voltage depends on the angle through which the flux lines have been turned. Since the voltage induced in the measuring coil 26 is proportional to the time derivative of the magnetic flux, it is necessary that for measuring the magnitude of the mechanical force P the exciting current in the coil 24 is an alternating current. If the exciting current were a direct current, the voltage induced in the measuring coil 26 would be a measure for the time derivative of the mechanical force P.

The measuring zone 3 consists substantially of the portion of the measuring body lying between the ducts. According to the invention the measuring body is further provided with two apertures 4 situated on each side of the measuring zone in the direction of the force P influencing the measuring body. The method of operation of the invention is most readily understood if the measuring body is thought to consist of three different portions which in FIGURE 1 are designated 5, 6 and 7 and separated by dotted lines. Due to the aperture 4 it is apparent that the middle portion 6 is considerably weaker from a mechanical point of view than the solid outer portions 5 and 7. The middle portion 6 will consequently absorb a considerably smaller share of the total force P than that corresponding to its cross section. By varying the size of the apertures 4 and their distance from the measuring zone it is possible to vary the magnitude of the force which will influence the measuring zone and consequently the ratio between the mechanical stress in the measuring zone 3 and in the parts 6 and 7 so that these last mentioned parts will be made full use of from a mechanical point of view. Also in a measuring body according to the invention, it is advantageous to provide those two sides on which the force to be measured is acting with projections 8 having a smaller cross section than the measuring body itself and on which the force P to be measured is applied, in which way it will be obtained that the distribution of the force over the surfaces upon which it is acting does not influence the measuring result. The apertures 4 can be used for locating the bolts which are necessary for guiding and keeping together the thin sheets stacked upon one another which normally form the measuring body.

FIGURE 2 shows another form of a measuring body 1 according to the invention which is also provided with apertures 9 which, however, in this case are so arranged that they entirely separate the measuring zone 3 with the winding ducts 20, 21, 22 and 23 from the remaining part of the measuring body, with the exception of two bridges 10 extending diametrically from the measuring zone 3 in the direction of the force P and having a considerably smaller cross section perpendicular to the direction of the force than the other parts of the measuring body. Also in this form of the invention the measuring body may be suitably thought to consist of three portions 11, 12 and 13 which are to be equally compressed by the force P. It is evident that in order to compress the rigid outer portions 11 and 13 a much larger force is required than for compressing the middle portion 12 which is considerably weaker due to the slender pillars 10. The measuring zone 3 will consequently be influenced only by a smaller share of the total force P than that corresponding to its cross section.

According to the invention it is also possible to provide the measuring body with apertures corresponding to the apertures 9 in FIGURE 2 as well as apertures corresponding to those designated 4 in FIGURE 1.

As previously mentioned, a force measuring device for large forces will normally comprise several measuring bodies which are influenced each by a share of the total force to be measured and the output voltages of which are added together. The measuring device is in this case preferably so designed that the different measuring bodies lie beside one another and form a single mechanical unit as in the manner described in patent specification No. 2,895,332. In a measuring device of this type with measuring bodies according to the invention certain difficulties arise, however. The reason for these are inter alia that in a measuring body according to the invention there exist, contrary to in a measuring body of the type hitherto known, large mechanical stresses all the way out to the side edges of the measuring body, due to which there will occur a mutual mechanical influence between adjacent measuring bodies. In a single solitary measuring body, the compression caused by the force acting upon the measuring body is followed by a corresponding expansion in a direction perpendicular to the direction of the force. If, however, the measuring body is joined along its side edges with adjacent measuring bodies this expansion is counteracted and this will cause a decrease in the sensitivity of the measuring body and further a mechanical interference between the measuring bodies. This mechanical interference between the measuring bodies will cause the output voltage of a certain measuring body to be not only a function of the mechanical loading of this measuring body but also to be dependent on the loading of the adjacent measuring bodies. The measuring bodies forming the outer edges of the measuring device are, however, not subject to any such mechanical interference on their free side surfaces, due to which the magnitude of the mechanical interference described above between the adjacent bodies is dependent upon the position of the measuring bodies within the measuring device. The sum of the output voltages of the different measuring bodies will consequently become dependent upon the distribution of the total force between the different measuring bodies.

In a force measuring device with several adjacent measuring bodies forming a mechanical unit it is, according to the invention advantageous to provide narrow slots between the different measuring bodies, which slots extend in the direction of the mechanical force acting upon the measuring body.

FIGURE 3 shows a measuring device consisting of three measuring bodies 14 of the type shown in FIGURE 1, which form a mechanical unit. According to the invention narrow slots 15 are arranged along the boundary line of the different measuring bodies 14. The slots 15 are extended almost out to the end surfaces of the measuring bodies upon which the force to be measured is acting so that the measuring bodies are mechanically joined by comparatively small and slender sections of material 16. The measuring bodies are consequently from the magnetical as well as the mechanical point of view entirely independent of each other. This form of the measuring device is, however, of course, comparatively weak towards mechanical forces not in alignment with the sensing direction of the measuring device. Further, measuring errors can occur if the force acting upon the measuring device is very unevenly distributed over the end surfaces of the measuring device. If, in an extreme case, the force is as unevenly distributed upon a measuring body as indicated by the arrows $P_1$ upon the left measuring body, this force $P_1$ will in the measuring zone of the measuring body only cause a diagonal shear stress which will influence the output voltage of the measuring body only to a very small degree, due to which a measuring error occurs. Particularly in the last mentioned point, the form of the invention shown in FIGURE 4 is more advantageous.

Also the measuring device shown in FIGURE 4 consists of three measuring bodies 17 of the type described in FIGURE 1. The measuring bodies are separated by narrow slots 18 along the border lines between the measuring bodies. These slots 18 end, however, at a considerable distance from the end surfaces of the measuring device influenced by the force to be measured. In this way there is provided at each one of these surfaces of the measuring device a comparatively strong section of material 19 which extends without interruption through all measuring bodies. These sections of material will function as two comparatively rigid "beams" or "plates" which are common to all measuring bodies and which will contribute to reducing too large variations in the distribution of the mechanical forces over the end surfaces of the measuring device. The slots 18, however, prevent substantially any mechanical and magnetical interference between adjacent measuring bodies.

We claim:

1. A force measuring device of the magneto-elastic type comprising at least one measuring body of magnetostrictive material, subject to the mechanical force to be measured, said force acting upon two parallel and opposite sides of said measuring body, said measuring body comprising a middle portion and two outer portions extending parallel to each other from one of said sides to the other, said middle portion having holes therein penetrating said body, at least two coils engaged in said holes, the part of said middle portion including said holes and said coils being a measuring zone, one of said coils being connected to an electric current source and serving as an excitation coil and the other coil being connected to an electric measuring device and serving as a measuring coil, the winding planes of said coils being disposed perpendicular to each other and at substantially 45° to the direction of said parallel and opposite sides, said middle portion being provided with apertures penetrating said body in the area between said measuring zone and said opposite parallel sides.

2. A force measuring device of the magneto-elastic type comprising at least one measuring body of magnetostrictive material, subject to the mechanical force to be measured, said force acting upon two parallel and opposite sides of said measuring body, said measuring body comprising a middle portion and two outer portions extending parallel to each other from one of said sides to the other, said middle portion having holes therein penetrating said body, at least two coils engaged in said holes, the part of said middle portion including said holes and said coils being a measuring zone, one of said coils being connected to an electric current source and serving as an excitation coil and the other coil being connected to an electric measuring device and serving as a measuring coil, the winding planes of said coils being disposed perpendicular to each other and at substantially 45° to the direction of said parallel and opposite sides, said measuring zone being separated from said outer portions by at least two substantially parallel oblong apertures, with their length perpendicular to said opposite parallel sides, at least two bridges extending from said measuring zone in directions substantially parallel to said apertures and having a cross-section parallel to said parallel sides which is considerably smaller than that of any other portion of the measuring body, said bridges forming the only connection between said measuring zone and the rest of the measuring body.

3. A force measuring device comprising at least two measuring bodies of magnetostrictive material, subject to the mechanical force to be measured, said force acting upon two parallel and opposite sides of each of said measuring bodies, each of said measuring bodies comprising a middle portion and two outer portions extending parallel to each other from one of said sides to the other, said middle portion having holes therein penetrating said body, each body being provided with at least two coils engaged in said holes, the part of said middle portion including said holes and said coils being a measuring zone, one of said coils being connected to an electric current source and serving as an excitation coil and the other coil being connected to an electric measuring device and serving as a measuring coil, the winding planes of said coils in each body being disposed perpendicular to each other and at substantially 45° to the direction of said parallel and opposite sides, said middle portion being provided with apertures penetrating said bodies between said measuring zone and said opposite parallel sides, said measuring device having narrow slots therein between each of said measuring bodies, said slots extending perpendicularly to said parallel opposite sides and ending at a substantial distance from said parallel opposite sides leaving at each of said parallel opposite sides a comparatively strong section of material extending unbroken through the whole measuring device.

4. A force measuring device comprising at least two measuring bodies of magnetostrictive material, subject to the mechanical force to be measured, said force acting upon two parallel and opposite sides of each of said measuring bodies, each of said measuring bodies comprising a middle portion and two outer portions extending parallel to each other from one of said sides to the other, said middle portion having holes therein penetrating said body, each body being provided with at least two coils engaged in said holes, the part of said middle portion including said holes and said coils being a measuring zone, one of said coils being connected to an electric current source and serving as an excitation coil and the other coil being connected to an electric measuring device and serving as a measuring coil, the winding planes of said coils in each body being disposed perpendicular to each other and at substantially 45° to the direction of said parallel and opposite sides, said middle portion being provided with apertures penetrating said bodies between said measuring zone and said opposite parallel sides, said measuring device having narrow slots therein between each of said measuring bodies, said slots extending perpendicularly to said parallel opposite sides and ending at a substantial short distance from said parallel opposite sides leaving at each of said parallel opposite sides a comparatively weak section of material extending unbroken through the whole measuring device.

References Cited in the file of this patent

UNITED STATES PATENTS

| | | |
|---|---|---|
| 2,160,007 | Turner | May 30, 1939 |
| 2,814,946 | Harris | Dec. 3, 1957 |
| 2,820,912 | Harris | Jan. 21, 1958 |
| 2,866,059 | Laimins | Dec. 23, 1958 |
| 2,895,332 | Dahle et al. | July 21, 1959 |